March 1, 1966  J. WIREMAN  3,238,400
GAS INPUT ASSISTED EVACUATION OF ROTOR-STATOR GAPS
Filed Feb. 4, 1963

INVENTOR.
JACK WIREMAN
BY White & Haefliger
ATTORNEYS.

United States Patent Office 3,238,400
Patented Mar. 1, 1966

3,238,400
GAS INPUT ASSISTED EVACUATION OF
ROTOR-STATOR GAPS
Jack Wireman, Anaheim, Calif., assignor to Task Corporation, Anaheim, Calif., a corporation of California
Filed Feb. 4, 1963, Ser. No. 255,947
16 Claims. (Cl. 310—54)

This invention relates generally to electrical machinery, and more particularly has to do with decreasing the so-called viscous friction drag developed between rotor and stator assemblies, in instances where they are exposed to liquid typically used for cooling and lubricating purposes.

Speaking generally with respect to the design and operation of high speed electrical machinery, it is found that their upper speed and load limits are governed by limitations of heat transfer from the stator and rotor assemblies. The inability to transfer heat from, or cool, the stator and particularly the rotor at sufficient rates causes excessive heating, so that rotor and stator temperatures must be controlled or kept below certain predetermined maxima to prevent burn-out of the motor. In conventional electric motors having coolant jackets surrounding the stator assemblies, these heat losses in the end turns of the stator winding must be transferred to the stator iron and then to the jacket, which is cooled by fluid circulation in confined spaces within the jacket. Also, the rotor assembly normally can dissipate its heat only by transfer to the bearings or by radiation to the stator. Accordingly, speed and load limitations of high speed motors are primarily governed by heat transfer rates from the stator and rotor assemblies.

Several methods have been developed in an attempt to achieve a more effective heat transfer from the rotor and stator, using coolant confined in the gap between the rotor and stator and subjected to vaporization primarily as a result of operating temperature increase. After coolant in the gap becomes vaporized, the rotor operates as if it were rotating in air, with very little skin friction or drag. In addition, utilization is made of the latent heat of vaporization of the coolant to absorb heat from the rotor while the fluid remains at the same temperature and vaporizes. Vapor bubbles then slowly discharge from the gap and into liquid outside the gap, where the bubbles collapse and give up their latent heat to the circulating fluid. Another technique typically utilizes pumping for expelling the liquid from the gap to produce the decrease in liquid pressure. However, in the application of these methods it has been found that the gap pressure oftentimes decreases so greatly that liquid tends to flow back into the gap, thus impeding the rotation of the rotor.

As will be brought out, this invention contemplates vaporization of coolant or lubricant in the gap, typically as a result of a sufficient reduction in pressure of the gap liquid that a vapor bubble or bubbles form. The gap pressure is dropped to the point where air dissolved in the coolant or lubricant comes out of solution to form the desired vapor bubble in the gap. Some or all of the liquid in the gap may also become vaporized at the reduced pressure conditions created therein. Also, as will be described later, in order to prevent return flow of liquid in the gap, gas is introduced into the gap.

In accordance with these new principles, it is a major object of the invention to provide, in an electrical machine that includes rotor and stator assemblies having a gap therebetween to which liquid has access, pumping means operable during machine operation for expelling liquid from the gap, thus reducing the liquid pressure in the gap to sufficient extent that a vapor zone forms therein during machine operation, and for introducing gas to said gap to maintain gap pressure higher than that maintainable by vapor alone, thus retarding the re-entry of liquid into the gap. As will be brought out, one desirable form of pump means serving these ends comprises peripheral grooving spiraling along and about the inside face of the stator extending about the gap.

Additional features of the invention include the provision of means to circulate lubricant or coolant over the stator and through the rotor body interior, said means typically communicating with a reservoir of lubricant or coolant from which gas may be circulated to the gap independently of said liquid circulation.

These and other objects and advantages of the invention, as well as the details of an illustrative embodiment, will be more fully understood from the following detailed description of the drawing, in which.

Figure 1:
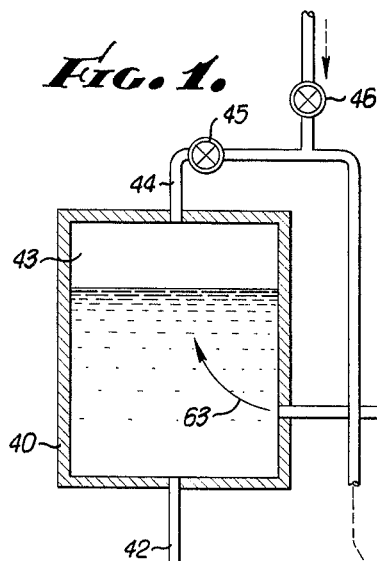
FIG. 1 is a three dimensional cutaway showing a typical motor, its housing and the liquid reservoir.

In the drawing, a motor housing or chamber generally indicated at 10 includes a tubular shell 11 flanged at 12, and end caps 13, the latter having a liquid inlet port 14 and a liquid outlet port 15, and the shell having a gas inlet port 16. Contained within the housing 10 are rotor and stator assemblies generally indicated at 17 and 18. The rotor includes a shaft 19 projecting at opposite ends of the body as illustrated and journaled in liquid-tight bearings 20 and 21 carried by the end caps 13. The shaft 19 is typically connected in driving relation with equipment not shown.

The rotor assembly 17 typically includes an iron core, the packed laminations 22 of which extend in planes perpendicular to the shaft axis 65. Circularly spaced conductor bars (not shown) are recessed into the core forming the squirrell cage associated with induction motors, there being annular end rings 24 and 25 at opposite ends of the body and joined with the conductor bars. Also, the rotor body contains endwise extending passages 23 extending through the end rings 24 and laminations 22.

The stator assembly 18 extends concentrically about the rotor to form a thin gap therebetween, the gap being ring-shaped at 26 about the rotor, and being annular at the end locations 27 and 28 adjacent the end faces of the rotor body, and the gap portions 27 and 28 extending inwardly to the rotor shaft 19 and communicating therewith. The stator assembly includes an elongated laminar core 29 containing openings, not shown, through which the stator windings extend in axial direction, the windings at opposite ends of the core being shown as rings 30 and 31.

The housing 10 is outwardly spaced at 32 from stator so that liquid paths are provided around the outside of the stator. Thus, liquid entering at inlet port 14 circulates around the stator as shown by arrow 33, and subsequently flows out of the housing through port 15 as shown by arrow 34. Likewise, liquid entering at inlet port 14 flows into the passages 23 in the rotor body, as indicated by arrow 35, and subsequently flows out of the housing outlet 15 as indicated by arrow 36.

Means is provided for reducing liquid pressure in the gap 26 by expelling liquid therefrom to sufficient extent that a vapor zone forms therein during machine operation. In this regard, it will be understood that the liquid gains access to the gap typically through the port 14. One form of such expelling means comprises peripheral grooving 37 spiraling endwise about the shaft axis 65 and at the inside face of the stator communicating with the gap as shown. Accordingly, a liquid expelling effect is created during shaft rotation in the direction of the arrow 60 and tending to reduce pressure in the gap 26 to a sufficient extent that a vapor zone forms therein. Liquid is expelled from the gap by induced flowage in the grooves 37 in the directions of endwise oppositely spiraling arrows 38 and 39, expelled liquid following paths 38 combining with incoming liquid flowing in paths 33 and 35 at one end of the rotor, while expelled liquid following paths 39 combines with outgoing liquid flowing in outlet paths 34 and 36 at the opposite end of the rotor.

As previously mentioned in the introduction, the pressure reduction may be such that air dissolved in the liquid comes out of solution and forms into bubbles substantially filling the gap. Also, it is possible for the liquid itself to vaporize and form a bubble at the reduced pressure within the gap. Accordingly, the rotor 17, the periphery of which has relatively high speed due to the enlargement thereof relative to the shaft diameter, is subjected to substantially reduced drag as compared with conditions where liquid fills the gap, since the skin friction associated with the vapor in the gap is minimal. Frequently, however, this desirable effect is lost where the gap pressure becomes so low that liquid flows back into the gap and the gap pressure then increases to a generally steady state value high enough that viscous drag impedes the rotation of the rotor to undesirable degree.

It has been found, however, that the introduction of gas such as air to the gap 26 as by port 16 retards the return flow of expelled liquid back into the gap, thus retaining the desired low viscous drag. This effect is typically of substantial importance at high rotor speeds, as for example in excess of 10,000 r.p.m. Since vaporization is achieved primarily by pressure reduction, it is not primarily dependent upon temperature increase, whereby many liquid coolants including different light oils become usable, as compared with the relatively restricted range of coolants which are usable where vaporization is primarily achieved through temperature increase. The importance of this advantage may be seen when it is realized that the motor may now be cooled by a wide variety of coolants thereby extending its utility to applications previously though to be infeasible.

FIG. 1 shows the port 16 extending radially through the stator assembly at 61 and terminating at the annular groove 62 sunk in the stator inner face about midway between opposite ends of the stator. The spiral grooves 37 are seen to extend in groups 37a and 37b, the grooves in each group being parallel. Also, grooves 37 spiral from groove 62 and terminate at end location 27, whereas grooves 37 spiral from groove 62 and terminate at end location 28.

The ports 14 and 15 are typically respectively connected to a liquid reservoir 40 by lines 42 and 41, and the port 16 is typically connected to gas reservoir 43. Valves 45 and 46 are placed in series with line 44 so that the gap 26 can receive gas from the reservoir 43 by opening valve 45 and closing valve 46, or alternatively the gap 26 can receive gas from an independent source by opening valve 46 and closing valve 45, the amount of gas in either case being regulated by the open valve. When the gap receives its gas from reservoir 43, the cooling system may be said to be regenerative in that during operation air dissolved in the gap liquid comes out of solution in response to gap pressure back to the liquid reservoir 40 through line 41 as by entrainment in the flow of liquid through said line. The air then rises in the reservoir at 63 and collects in the reservoir 43 for return to the gap.

Figure 2:
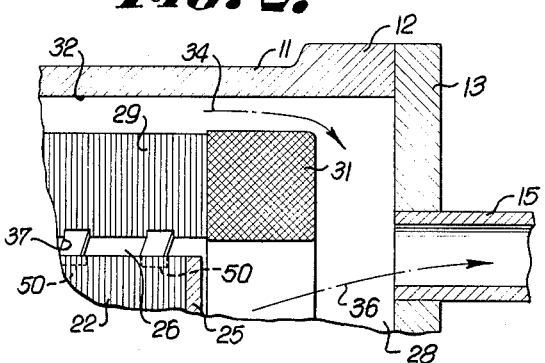
FIG. 2 is a fragmentary section taken on an axial vertical plane and showing the gap and grooving formed by the rotor and stator.
Figure 2:
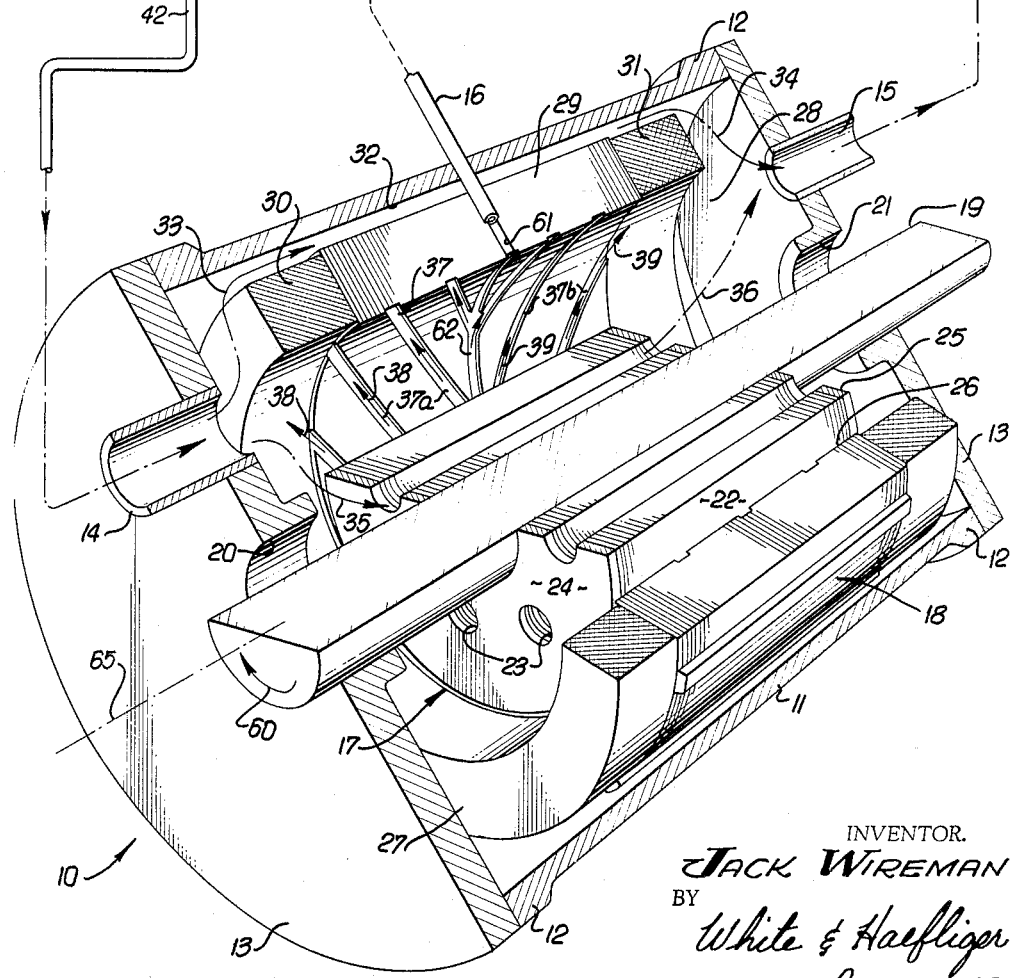

One important application is in a closed system where the pressure at 43 is high enough that the grooves cannot reduce the gap pressure to the vapor point. In this case, the pressure drop at 45 is made equal to zero and the pressure rise which the screw pump must work against is only that of the column of liquid. The grooves will then sweep out the liquid in the gap and replace it with air through 45. In this manner the system is insensitive to the pressure at 43; also since the pumping action of the grooves is a function of viscosity, as soon as the liquid is expelled from the gap, no more air will be drawn from the reservoir. As such, the system has a self-regulating characteristic. Finally, it is pointed out that the grooves may be formed in either or both the stator and rotor, possible rotor grooving being indicated by the broken lines 50 in FIG. 2.

I claim:

1. In an electrical machine, as assembly that includes rotor and stator members having a gap therebetween to which liquid has access, the assembly including means operable during machine operation to reduce liquid pressure in said gap to a sufficient extent that a vapor zone forms therein and means for introducing gas to said gap to maintain gap pressure higher than that maintainable in the absence of said gas introduction.

2. The invention as defined in claim 1 in which at least one of said members has grooving communicating with said gap operable during machine operation to effect expelling of liquid from said gap.

3. The invention as defined in claim 2 in which said grooving spirals endwise about the axis of rotation and at a side of said gap.

4. The invention as defined in claim 3 in which the inside face of the stator forms said grooving.

5. The invention as defined in claim 1 in which said means for introducing gas to said gap includes ducting communicating said gap with a source of gas.

6. The invention as defined in claim 5 in which said ducting passes through said stator to terminate at said gap.

7. The invention as defined in claim 5 including a valve placed in series with said ducting to control the gas flow to said gap.

8. The invention as defined in claim 1 in which said assembly includes a housing for said assemblies and having porting through which liquid circulates for cooling at least one of said members.

9. The invention as defined in claim 8 in which said rotor contains generally axial passage extent through which liquid flows in cooling relation with the rotor.

10. The invention as defined in claim 8 including a reservoir communicating with said porting to supply liquid for circulation in cooling relation with the machine.

11. The invention as defined in claim 10 in which the porting is located to effect flow of liquid along the outside periphery of said stator and adjacent the ends of said rotor and stator members.

12. The invention as defined in claim 3 in which said grooving includes an annular groove located to receive said gas, a first group of generally parallel grooves spiraling from said annular groove anad terminating at one end of the rotor, and a second group of generally parallel grooves spiraling from said annular groove and terminating at the other end of the rotor.

13. In the method of operating an electrical machine that includes an assembly comprising rotor and stator members having a gap herebetween to which liquid has access, the steps of expelling liquid from the gap to a sufficient extent that a vapor zone forms therein, and introducing gas into said zone so as to establish gap pressure greater than is establishable without gas introduction.

14. The method as defined in claim 12 in which said gas introduction is controlled to resist return flow of liquid into said gap.

15. The method as defined in claim 13 including the step of flowing liquid about said stator in cooling relation therewith and also in merging relation with liquid expelled from said gap.

16. The method as defined in claim 15 in which said gas is supplied from a reservoir receiving said flowing liquid with gaseous entrainment and from which liquid is supplied to cool said machine.

References Cited by the Examiner

UNITED STATES PATENTS 1,443,644   1/1923   Nobuhara _____ 310—54

ORIS L. RADER, *Primary Examiner.*
JOHN F. COUCH, *Examiner.*